Patented Nov. 2, 1937

2,098,078

UNITED STATES PATENT OFFICE 2,098,078

FRICTION MATERIAL

William L. White, Clifton, N. J., assignor to Raybestos-Manhattan, Inc., Passaic, N. J., a corporation of New Jersey No Drawing. Application October 7, 1933, Serial No. 692,619

4 Claims. (Cl. 106—7.5)

Friction materials such as brake linings, brake blocks, clutch facings, and the like have been made of woven asbestos fabrics or tapes impregnated or bonded together with such materials as oxidized oils, natural and artificial asphalts, synthetic resins and rubber. Likewise, many types of friction materials have been produced by saturating asbestos millboard or felted asbestos fibers with similar types of binders, or asbestos fibers have been mixed with rubber or like binders and then molded under pressure and heat to hard segments of desired size and shape. In all of the above cases the use of the saturant or binder has been primarily to give the resultant products strength and rigidity.

I have found that the successful operation of friction materials such as brake linings or brake blocks demands that there be a very slight lubrication. When the brakes are engaged in a moving vehicle, very high almost instantaneous surface temperatures are developed. These temperatures may often exceed 1,000° F. Where dry, harsh friction materials are used, if there is no lubrication present, then under high temperatures and pressures the brake drums are readily scored or the braking application is accompanied by excessive noise, squealing and chatter. However, if a very limited and proper amount of lubrication be present, then the braking operation can be made smoothly, quietly, and with greatly reduced tendency toward scoring of the drums. The need for this lubrication is greatest when the temperatures and pressures are the highest. When temperatures and pressures are low, the lubrication of these friction materials is quite likely to interfere with the proper braking action, so the problem resolves itself into the use of a material which will lubricate to a limited degree at high temperatures but will have little or no lubricating properties at low temperatures.

I have found that soft, vulcanized rubber possesses these qualities to a marked degree: At high temperatures it has sufficient lubricating qualities if used in a limited quantity, and at low temperatures instead of being a lubricant it is quite high in coefficient of friction. I am aware that rubber has been used in friction materials, but it has always been used as a binder. True, additional binders, such as phenol resins, have been used with the rubber binder, but in all cases sufficient sulphur has been added to the composition to vulcanize the rubber to hard rubber because rubber acts as a useful binder in friction materials only if it is vulcanized hard.

In my process, I take rubber that has been previously vulcanized and grind and pulverize it until it can be passed through a 20 mesh wire screen. Then, in any suitable mixer, such as a tumbling barrel or a Werner-Pfleiderer mixer, I mix intimately about 10 parts of this finely powdered rubber dust with 60 parts of asbestos fiber and 30 parts of some suitable resin such as phenol resin, mold this mixture under sufficient temperature and pressure to make the resins infusible, and produce a hard, dense mass of the proper size and shape. The surfaces are usually ground, and the friction material is then ready for use.

In the resultant block or facing there are distributed uniformly throughout its mass a great number of minute rubber particles, each of which will act separately to properly lubricate at high temperatures the areas immediately adjacent to it. The prime function of the rubber is to provide these dots of lubrication. The prime function of the resin is to serve as an infusible binder to hold the mass together. Since the high temperature is primarily a flash surface temperature, then only the dots of rubber exposed to the surface will act as lubricating spots, and the particles of rubber underneath the surface remain practically unchanged. As the lining wears down, these new dots of rubber are exposed, thus giving a constant lubricating surface throughout the life of the lining or facing. Obviously, I can secure any degree of high temperature lubrication by the proportion of rubber used and, to some degree, by the particle size.

While I prefer to use rubber as the lubricant, yet I do not confine myself solely to rubber. I can use crystalline or granular materials, such as the chlorinated diphenyls (aroclors), the very high melting point natural asphaltums, such as Grahamite and Wurtzilite, or the high melting point hydrocarbons that result from the distillation of oil, asphaltum, coal tar and the like, or such plasticizers as paratoluenesulfonanilid or chlorinated naphthalene. In securing my vulcanized rubber, I can use vulcanized virgin rubber with 2 to 6% of sulphur and then pulverize and screen, or I may use any suitable scrap or used vulcanized rubber. I prefer to use only soft rubber with sulphur not exceeding 6%, but I can use, with perhaps lesser effectiveness, powdered hard rubber dust, but in no case do I depend upon the rubber as a binder; its prime function is a high temperature lubricant that will have little or no lubricating effects at low temperatures.

As binders, I prefer to use a dry, powdered, binding resin, but obviously I can secure binding properties with liquid as well as with powdered resins. Any type of conventional binder may be used including oxidizable oils, natural and artificial asphalts, and I can use any type of polymerized binder or any condensation product which will not soften to too great a degree under heat to properly function as a binder. I can use any type or length of asbestos fiber needed. These fibers can be mixed in any convenient way with the rubber particles and binders and can either be a loose mix which will be compressed or can be felted or made into asbestos millboard, or can be spun into yarns and woven or braided into fabrics. If felted or made into millboard the asbestos and the non-metallic lubricating materials can be mixed in the beater and the binder added as a separate operation or all three ingredients can be mixed at one time in one operation. In applying the invention to the manufacture of friction materials from woven or braided fabrics the rubber dust and binder in powdery condition may be dusted into the asbestos on the carder. In addition to these three basic elements, I can add any other desirable pigments or fillers.

It is to be understood, of course, that the specific proportions named in the illustrative example may be varied widely, depending on the type of binder used and the frictional use or abuse to which the particular friction material being made is to be put.

By high temperatures I refer to the temperatures secured by repeated stopping of an automobile traveling at the speed of 40 miles per hour with a deceleration rate of not less than 15 feet per second per second, two such stops per mile. By relatively low temperatures I refer to the temperatures secured by the stopping of an automobile traveling at the speed of 20 miles per hour with a deceleration rate of approximately 5 feet per second per second, repeating such stops not more than one per mile.

I claim as my invention:

1. Friction material, comprising a hard, dense mass of asbestos fibers and an organic binder cured to provide the desired coefficient of friction, having distributed therethrough a relatively small amount of finely divided particles of vulcanized soft rubber having the property of melting to lubricate the working surface of said friction material at relatively high temperatures and of such a character that they will not melt to lubricate the working surface of said friction material at relatively low temperatures.

2. Friction material, comprising a hard, dense mass of asbestos fibers and a binder cured to provide the desired coefficient of friction, having distributed therethrough a relatively small amount of finely divided soft rubber particles comprising sulphur in a quantity not exceeding 6% and which particles will melt to lubricate the working surface of said friction material at relatively high temperatures but which will not melt to lubricate said surface at relatively low temperatures.

3. Friction material, comprising a hard, dense mass of asbestos fibers and a binder cured to provide the desired coefficient of friction, having distributed therethrough a relatively small amount of finely divided soft rubber particles comprising sulphur in a quantity not exceeding 6% and which particles will melt to lubricate the working surface of said friction material at relatively high temperatures but which will not melt to lubricate said surface at relatively low temperatures, characterized in that the rubber particles are present in an amount, by weight, less than the binder or the asbestos.

4. A friction material composed of 60 parts of asbestos fibres, 30 parts binder and 10 parts of finely divided soft rubber particles uniformly distributed throughout the mass.

WILLIAM L. WHITE.